July 21, 1970  K. DEURING ET AL  3,521,511

CONNECTING NUT FOR CLAMPING TOOLS

Filed Nov. 28, 1967

INVENTORS
KARL DEURING
HEINZ BECKERS

United States Patent Office 3,521,511
Patented July 21, 1970

3,521,511
CONNECTING NUT FOR CLAMPING TOOLS
Karl Deuring, Dusseldorf, and Heinz Beckers, Dulken, Germany, assignors to Forkardt Kommanditgesellschaft, Dusseldorf, Germany
Filed Nov. 28, 1967, Ser. No. 686,208
Claims priority, application Germany, Feb. 18, 1967, F 51,565
Int. Cl. B23b 29/02
U.S. Cl. 82—30
3 Claims

ABSTRACT OF THE DISCLOSURE

Clamp arrangement for chucks or face plates in which clamp screws extend therethrough and receive nuts for cooperation with cam locking devices of a spindle, and wherein the end of each nut into which the screw extends is inclined so that tightening of the screws before assembly of the chuck or face plate with the spindle will cause tilting of the nuts and thereby prevent assembly of the face plate or chuck with the spindle.

---

The present invention relates to a nut for connecting clamping tools such as chucks, face plates and the like which by means of screws operable from the outside are screwed to spindle heads, especially of lathes. The front ends of spindles of turning machines are at present frequently provided with a flange which for purposes of receiving the clamping tool is equipped with a short cone with an outwardly adjacent plane surface. For these so-called short cone spindle heads, in all important industrial countries, identical standards have been developed so that it is possible to exchange clamping tools in machines of the same sizes. The oldest of these standards which has served as the basis for all other standards is U.S. Standard ASA B5.9. The first issue of these standards of 1936 already contained the basic forms and measurements which are still valid today. The said American standard contains three main designs of the short cone spindle head, namely, the types A, B and D1. The measurements of the cones in all three types are identical. The difference of said types is the way in which they are intended to meet different requirements with the different type of machines. The most frequently employed types are A and D1.

According to type A, the clamping tool is fastened by means of screws which are passed through bores extending through said clamping tool and are screwed into correspondingly threaded bores of the spindle head. Since in each instance, a plurality of screws have to be screwed in entirely, or screwed out entirely, the exchange of the clamping means or tools is somewhat time consuming with this type. This type is therefore suggested primarily for such machines in which an exchange of the clamping means is only seldom effected. For lathes with frequently changing work, the U.S. Standard ASA B5.9 recommends the type D1, which due to the cam lock employed therewith is frequently also called the cam lock type. Also, this design is frequently used in all industrial countries and is a clearly understood trade term. With this embodiment, the flange of the spindle is thicker than the flange with the embodiment A. Depending on the size, the flange has 3 or 6 smooth axis-parallel passages into which loosely fits a stay bolt or stud previously screwed into the chuck from the rear. Each stay stud, or also called cam lock bolt has its smooth portion extending into the spindle flange provided with a cutout with an inclined surface. Each spindle flange has adjacent each passage a bore which intersects said passage and is directed perpendicular to the spindle axis, and in this bore there is located a specially designed clamping eccentric or cam, which at its outer end has a square hole and is safeguarded against dropping out, by means of a trunnion screw inserted from the front face. Each of the 3 or 6 clamping eccentrics or cams can be turned from the outside by a wrench. Its respective angular position is indicated by a marking and is secured by a spring lock. Prior to mounting a chuck or the like, the cam locks are so adjusted that the passages are free. After the chuck or the like has been mounted, half a revolution of the just upwardly directed cam will suffice in order for the time being to hold the chuck fast. Subsequently, the remaining 2 or 5 eccentrics or cams are rotated in the same manner and tightened, whereby the chuck will be pulled toward the plane surface of the spindle head and will thus be connected.

As to the designs of spindle heads with short cones, all described embodiments and details are standard and therefore are exchangeable internationally, which part represents numerous advantages for the users of such equipped machines. A fundamental advantage is seen in that with a corresponding design of the clamping tool, an intermediate flange is no longer required. For the manufacturers of clamping tools, the introduction of the short cone connection has, however, caused some difficulties which partially affect the users. Whereas, when employing intermediate flanges, a certain chuck size can be produced only in a single design and has to be stocked, the flange connection makes it imperative to produce each size not only with 2 or 3 different centering cones and corresponding pitch circles of the connecting elements, but in most instances, also in the two embodiments, type A and type D1 (cam lock).

It is not possible to provide the connections or connecting bores for both types at the same time in the body of the clamping tool. Thus, the manufacturer, distributor, and user of clamping tools is forced always to produce and stock respectively different designs of the same chuck size.

It is, therefore, an object of the present invention to overcome the above mentioned drawbacks.

It is a further object of this invention to provide a structure, by means of which, to a spindle head of the type D1 described by ASA B5.9, can be connected a clamping tool designed in conformity with type A of the said American standard with bores for connection by means of head screws. Since the said spindle head is intended for a cam lock connection, the present invention provides a new type of connecting nut which is shaped on its outside to fit into the holes of and cooperate with the cams built into the type D1 spindle head, and has a threaded hole to receive one of the head screws of the type A clamping tool; further the nut has means for positioning itself on the back of the clamping tool in such specific manner, as to make the mounting of the clamping tool an easy and fool-proof operation.

For this purpose that end face of the connecting nut which faces the clamping tool, is provided with an off-center protrusion which loosely fits into a groove in the contacting surface of the clamping tool. The said groove and protrusion will assure that the connecting nut when fitted to a clamping tool, will have the cutout on its outside in the right angular position for the cam of the spindle head to catch it properly. According to a further feature of the invention the end face of the connecting nut facing the clamping tool is declined by some degrees with regard to a plane normal to the axis of the nut, which results, when the nut is tightened, by the connecting screw, against the back of the clamping tool, in a radially outwardly directed displacement of the outer end of the connecting nut.

This embodiment makes it possible merely by screwing on connecting nuts according to the invention onto the connecting screws, also to connect a clamping tool of the design type A onto a spindle head of the type D1 (cam lock) while the advantages of the cam lock connection are maintained to its fullest extent. Further, by the specific design of the end of the connecting nut facing the clamping tool, handling errors are excluded and at the same time the connection of the clamping tool is improved. The number of embodiments required per size of a clamping tool are cut into half.

While it is known to arrange connecting nuts designed in the manner of a cam lock stud in the spindle head of the type D1 (cam lock), so that clamping tools of a design according to type A can be connected by means of their connecting screws to said spindle head, such connecting nuts have not been adopted in practice for the following reasons:

The known connecting nuts, which are also called cam lock nuts, have prior to the mounting of the clamping tool, to be inserted into the spindle head and have to be tightened by the cam lock. In this way, the spindle head of type D1 is, so to speak, converted into a spindle head, type A, with threaded bores into which the head screws of the clamping tool of type A can be screwed. This solution, however, can be considered only as an emergency solution because the advantages of the cam lock design, namely, the fast connection and disengagement of the clamping tool is lost completely, particularly when alternately a clamping tool of the type D1, with cam lock studs and a clamping tool of the type A with head screws extending all the way through, are to be connected to the spindle head. In this instance, the cam lock nuts inserted into the spindle head have to be individually withdrawn and later on have to be inserted again individually.

The cam lock nuts according to the invention, on the other hand, are not inserted into the spindle head prior to the mounting of the chuck, but are connected to the chuck by means of connecting screws. They are mounted on the spindle head together with the chuck and they are withdrawn from the spindle head together with the chuck. This does not require any additional time. Moreover, in this way, the spindle head will, immediately after removal of a chuck fastened by the new nuts, be free again for receiving another chuck which may be provided, e.g. with customary cam lock bolts.

Prior to the mounting of the chuck upon the spindle head, the cam lock nuts must be connected only loosely to the connecting screws, so that they can easily be introduced into the receiving bores of the spindle head and can freely assume their angular position in conformity with the cams when the latter are tightened. A third reason why the cam lock nuts must be connected only loosely to the connecting screws prior to the mounting of the chuck upon the spindle head consists in that following the tightening of the cams, there will be possible an additional tightening of the chuck against the spindle head by tightening the connecting screws. This would be impossible when these screws had previously pulled the nuts firmly against the chuck body.

A person not familiar with these conditions would be inclined to firmly tighten the connecting screws already before the chuck is on the machine and would in this way, without realizing it, make impossible the proper firm connection of the chuck with the spindle head. It is the very purpose of the above mentioned inclined design of the cam lock nut end face facing the clamping tool to prevent the premature firm tightening of the connecting screws. In other words, the said inclined design of the said cam lock nut end face will forcibly bring about the necessary loose connection of the screws and nuts prior to the mounting of the clamping tool on the spindle head. More specifically, as long as the clamping tool is not yet on the spindle head, the nuts will assume such an inclined position that their outer ends will be tilted radially outwardly so that they are located along a circle, the diameter of which is greater than the pitch circle of the receiving bores in the spindle head. As a result thereof, an insertion of the clamping tool with prematurely tightened fastening nuts will be prevented while the spread condition of the connecting nuts in this condition simultaneously and in a simple manner will indicate that the clamping tool of type A had not been properly prepared for insertion into the spindle head of the type D1. The inclined position of the connecting nuts is made possible by the prevailing tolerance between the connecting screw and the bore and by the play in the thread. By loosening the connecting screw, quickly and well recognizable, a position of the connecting nuts will be obtained which makes possible an insertion of the clamping tool into the spindle head.

Furthermore, when employing a connecting nut according to the invention, the advantage is obtained that following the tightening of said connecting nut by the cam lock of the spindle head, the head screws themselves can be tightened, whereby with little more effort a considerably better adaptation and a complete safety against undesired loosening of the connection will be obtained. For mounting and tightening, and also for purposes of loosening or withdrawing, only slightly more time is employed than where using the heretofore known cam lock bolts.

The invention is illustrated by way of example in the accompanying drawings, in which.

Figure 1:
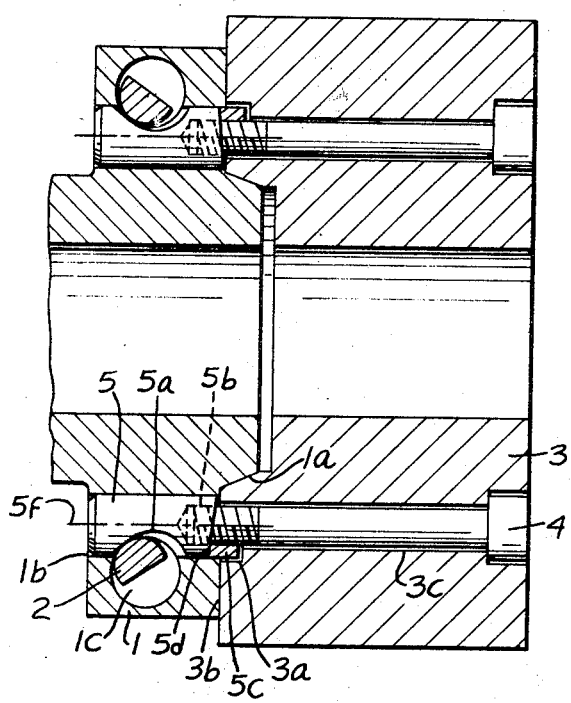
FIG. 1 illustrates a longitudinal section through a clamping tool connected to a spindle head.

Referring now to the drawing in detail, the spindle head 1 illustrated therein is designed in conformity with the U.S. Standard ASA B5.9 type D1. More specifically, the spindle head 1 has a centering cone 1a which cooperates with a corresponding centering bore of the clamping tool 3. Uniformly distributed over a bolt circle there are arranged bores 1b which normally receive stay bolts in the form of cam lock studs. For purposes of tightening these stay bolts, each receiving bore 1c has a clamping eccentric or cam lock 2 in the spindle head 1 which cooperates with a corresponding recess on the respective stay bolt.

The clamping tool 3 illustrated in FIG. 1 is designed in conformity with U.S. Standard ASA B5.9 type A2 and is provided with bores 3c for the connecting screws 4. The clamping tool 3 may be of any desired type, as for instance, a jaw chuck, a face plate or the like.

A connecting nut 5 is by means of a threaded bore 5b screwed onto the end of the connecting screw 4. Said connecting nut 5 is dimensioned in conformity with the dimensions of the cam lock stud intended for the spindle head 1 and is provided with a cutout 5a for the cam lock 2.

Figure 2:
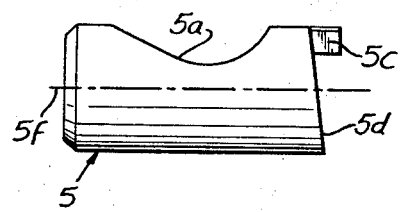
FIG. 2 is a side view of the connecting nut employed in FIG. 1, but on a larger scale than in FIG. 1.
Figure 3:
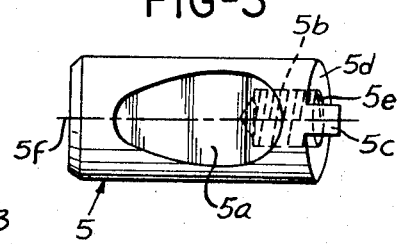
FIG. 3 is a side view of the connecting nut of FIG. 2 turned by 90°.
Figure 4:
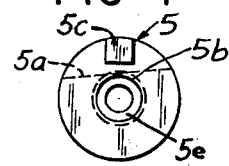
FIG. 4 is an end view of the connecting nut according to FIGS. 2 and 3.

As will be evident from FIGS. 2–4, the end face 5d of the connecting nut 5 which faces the surface 3b of the clamping tool 3 is inclined relative to the normal plane, or in other words, is inclined to the plane which is perpendicular to the longitudinal axis 5f of the nut 5. This inclination may be within the range of from 2 to 3°. The end face 5d is furthermore provided with a protrusion 5c adapted to engage a recess 3a in the surface 3b of the tool 3 in order to prevent connecting nut 5 from rotation when the connecting screw 4 is screwed into the connecting nut 5. When the tool 3 designed in conformity with U.S. Standard ASA B5.9 type A is to be connected to the spindle head 1 designed in conformity with U.S. Standard ASA B5.9 type D1, the connecting nuts 5 are screwed onto the connecting screws 4 while the connecting nuts 5 are prevented from turning, by means of the protrusion 5c extending into the recess 3a. As soon as the connecting nuts 5 have one of their edges of their end face 5d in engagement with the surface 3b of the tool 3, the respective nut will occupy the position required for insertion into the spindle head 1, inasmuch as it is movable to a slight extent in order to be able to be inserted into the bores 1b of the spindle head 1.

Figure 5:
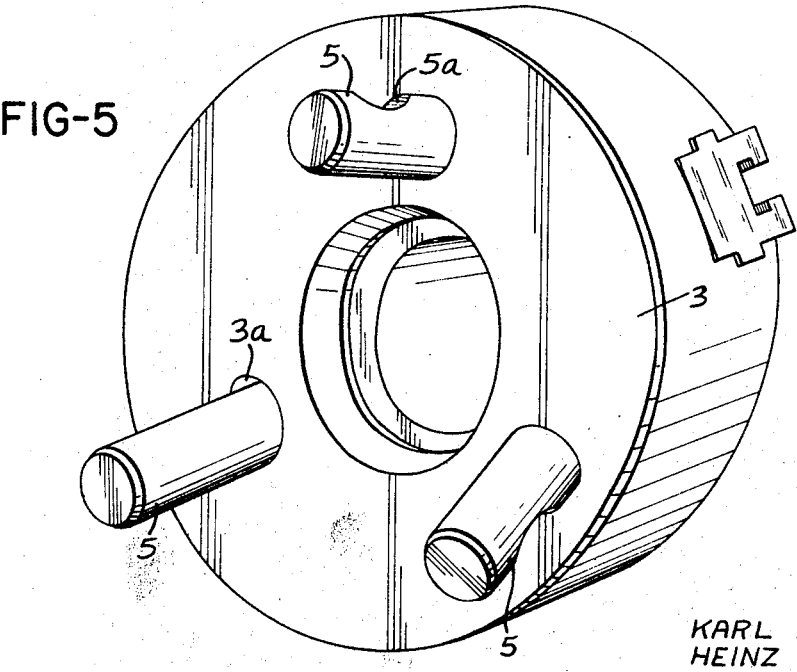
FIG. 5 is a perspective illustration of a clamping tool according to the invention with connecting nuts spread by tightening the connecting screws.

If, due to error, the connecting screws 4 are tightened firmly so that there exists no movability for the connecting nuts 5, the latter will occupy the spreading position shown in FIG. 5 which will immediately indicate that with such a position of the connecting nuts 5, the clamping tool 3 cannot be mounted on the spindle head 1. This outwardly spreading or flaring position of the connecting nuts 5 is obtained by the inclination of the end faces 5d of the connecting nuts 5.

A slight backing off of the connecting screws 4 will suffice to return the connecting nuts 5 to the normal position thereof in which they can be introduced without difficulty into the receiving bores 1b of the spindle head 1. By turning of the cam lock 2, there will then be effected a first clamping of the tool to the spindle head 1. By tightening the connecting screws 4; a subsequent stronger clamping action can be realized.

In this way, when employing the connecting nuts 5 according to the invention, clamping tools of the type A according to the U.S. Standard ASA B5.9 can alternately, with the clamping tools of the type D1 be mounted on a spindle head 1 designed in conformity with the U.S. Standard ASA B5.9 type D1 without requiring any changes on the spindle head 1 itself. Also, an employment of the clamping tool 3 on a spindle head of the type A is possible without any changes of the clamping tool 3, because it is merely necessary to remove the connecting nuts 5 from the connecting screws 4.

It is, of course, to be understood that the present invention is, by no means, limited to the particular construction shown in the drawing, but also comprises any modifications within the scope of the invention. Thus, the connecting nut according to the invention may also be employed with clamping tools, the connecting screws of which, are not passed through from the front side of the clamping tool, but from the outside thereof, i.e. that the connecting screws can be tightened either through a wrench bore in the front side, or through openings in the side of the clamping tool.

We claim:
1. An arrangement for clamping a device such as a face plate or chuck to a spindle, especially where the device and spindle have mating cone surfaces thereon, in which the device has axial bores for receiving clamp screws for threading into threaded clamp screw holes of a spindle or for receiving nuts to be received in bores in a cam lock type spindle, said arrangement including a nut receivable on the end of each clamp screw in the device, each nut being receivable in a respective bore in the spindle, each nut having a lateral recess to receive the pertaining cam lock element of the spindle, one of the ends of each nut adjacent the device or the region of the end of the device adjacent the nut being inclined to the axis of the nut so that when a nut is drawn up tightly against the end of the device before the device is assembled with a spindle so that the nut is confined in a bore of said spindle the nut will tend to tilt on the device and thereby displace its spindle end laterally from the position it must occupy to be received in the bore, and means keying each nut to the device to keep the nuts in such rotated positions on the device that the recesses of of the nuts are in the proper position for receiving the cam lock elements of the spindle.

2. An arrangement according to claim 1, in which the ends of the nuts adjacent the device are inclined to the axis of the nuts and the adjacent end of the device is planar.

3. An arrangement according to claim 1, in which the angle of inclination of the end of each nut is such that tilting of the nut due to tightening of its screw will take place in the radially outward direction of the device.

References Cited

UNITED STATES PATENTS

| 1,980,336 | 11/1934 | Hoagland | 82—30 |
| 3,085,811 | 4/1963 | Pridgeon | 279—1 |

LEONIDAS VLACHOS, Primary Examiner

U.S. Cl. X.R.

279—1